June 11, 1968     H. HOFFMANN ET AL     3,387,650
RECEPTACLE FOR KEEPING THE CONTENTS EITHER HOT OR COLD
Filed Oct. 18, 1966     2 Sheets-Sheet 1

Inventors:
HORST HOFFMANN AND ARNOLD MUSSHAKE
BY: Burgess, Dinklage & Sprung
ATTORNEYS Inventors:

HORST HOFFMANN AND ARNOLD MUSSHAKE

BY: [signature]

ATTORNEYS

United States Patent Office 3,387,650
Patented June 11, 1968

3,387,650
RECEPTACLE FOR KEEPING THE CONTENTS
EITHER HOT OR COLD
Horst Hoffmann, Munich, and Arnold Masshake, Augsburg, Germany, assignors to IBA-Musshake & Co., Augsburg, Germany
Filed Oct. 18, 1966, Ser. No. 587,499
Claims priority, application Germany, Oct. 20, 1965, J 29,212
3 Claims. (Cl. 165—75)

ABSTRACT OF THE DISCLOSURE

Receptacle for keeping its contents hot or cold, which receptacle is made up of sidewalls, a bottom and a cover, which sidewalls are insulating material having some sort of wear-resistant outer coating and a conductive foil on the inside thereof. The bottom is made of insulating material having a relatively heavy wear-resistant coating on the outside and may additionally have conductive material on the inside surface abutting and making good thermal contact with the conducting coating on the inside of the sidewalls. A tray is provided beneath the cover inside this receptacle, which is adapted to contain either heat imparting or heat extracting material, which tray rests on shoulders in the sidewalls and, at the shoulders, makes good thermal contact with the conductive inside linings of the sidewalls.

---

The invention relates to receptacles for keeping goods as for instance foodstuffs at a higher or lower temperature than the ambient temperature.

It is known to make the container of such for instance portable receptacles of heat-insulating material and to provide an inset of a heat-conducting material with a cold or heat delivering material above the contents as for instance foodstuffs.

It is the object of the invention to keep the contents of such containers for a longer time at a desired temperature or at a lower temperature than with known receptacles. According to the invention the heat insulating material forms an inherently rigid vessel and an inherently rigid cover, and at least the greater part of the inner wall of the vessel is provided with a sufficiently thick layer of heat-conducting material, which is heat conductingly connected to an inset with a cold or heat-delivering material above the contents in said vessel.

The inset can be a box of a heat-conducting material which receives the cold or heat delivering material. Preferably this box is provided at the upper end of the vessel, but it may also be provided at the bottom of the vessel.

The wall of the vessel can comprise a plurality of alternatively arranged layers of heat-insulating and heat-conducting material, the heat-conducting layers being heat conductingly connected to the cold or heat-delivering inset. The layers of heat-conducting material can also be heat conductingly connected to a cold delivering and to a heat delivering inset.

The drawings illustrate various embodiments of the invention.

Figure 1:
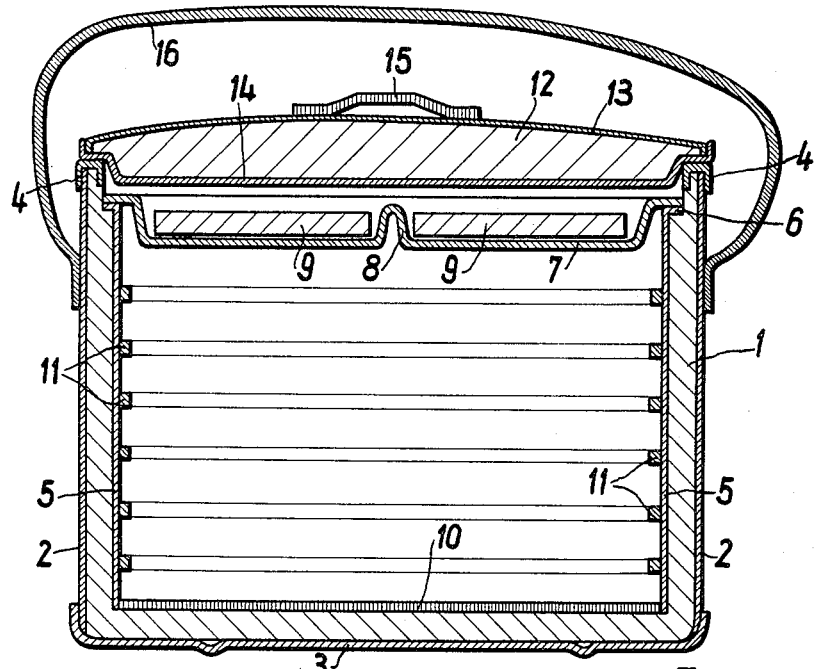
Figure 2:
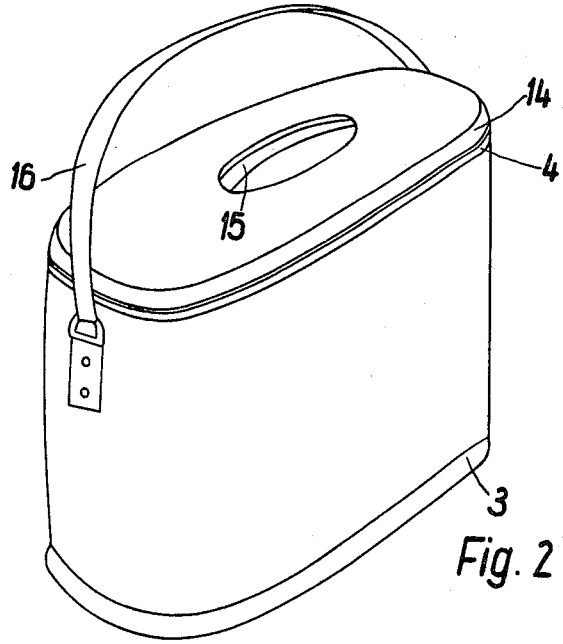
Figure 3:
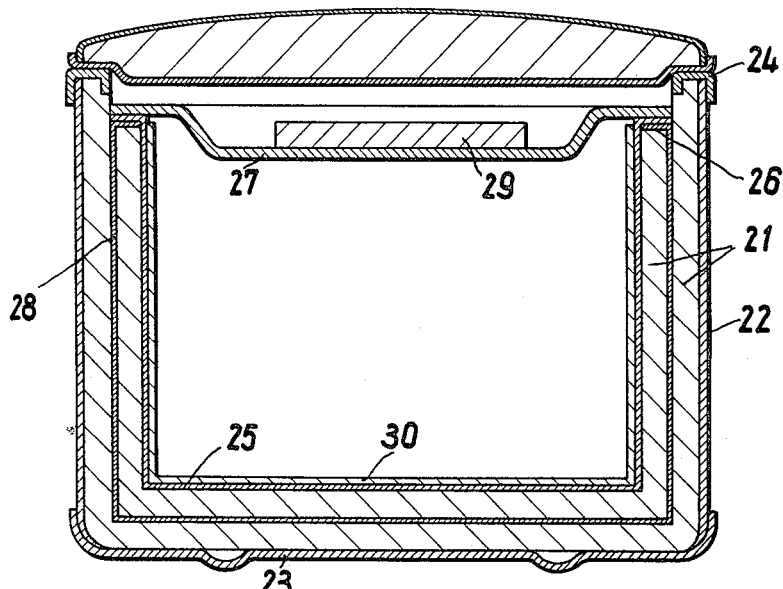
Figure 4:
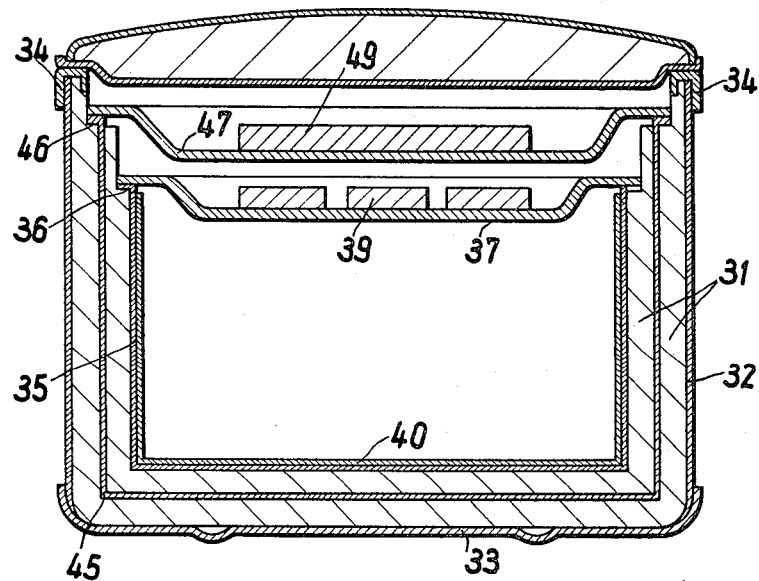

FIG. 1 shows a longitudinal section of a portable receptacle according to the invention, FIG. 2 shows an elevation of the receptacle of FIG. 1, FIG. 3 shows a longitudinal section of another embodiment of a portable receptacle according to the invention, FIG. 4 shows a longitudinal section of a third embodiment of the invention.

The wall of the vessel of the receptacle comprises an inherently rigid layer 1 of a porous and heat-insulating plastic which is foamed to the desired form. The outer sidewalls of the receptacle are coated with a thin layer 2 of for instance weak polyvinyl chloride. The outer bottom of the receptacle 3 is coated with the strong plastic as for instance hard polyvinyl chloride. The same material can be used for coating 4 the upper rim of the layer 2. The inner sidewalls of the vessel are coated with an aluminum foil 5 of about 0.1 mm. and form a shoulder 6 near their upper end around which the foil 5 is bent.

Instead of a foil a wire mesh can be used. On the shoulder 6 rests a flat removable, open bowl 7 of aluminum which is heat conductingly connected to the aluminum foil 5. The bowl 7 has a rib 8 which forms a handle. The bowl receives a cold delivering material 9, for instance ice or ice-cooled metal pieces. Instead of the bowl 7 with a cold-delivering material 9 a cooled metal plate with a corresponding heat capacity can be inserted into the vessel. The underside of the cover lines 5–10 mm. above the bowl 7. The bottom of the vessel is coated with layer of plastic, for instance hard polyvinyl chloride. The aluminum foil 5 can be provided with distance rings 11 and can be coated with a heat insulating layer or with a varnish layer which prevents a direct contact of the contents of the vessel with aluminum foil 5.

The cover of the vessel comprises a rigid layer 12 of the same foamed plastic as the layer 1 and is coated with a layer 13 of the same material as the layer 2. At the lower side the cover is coated with a layer 14 of the same material as the coatings 3 and 4. The cover is provided with a handle 15. To the layer 2 a girdle 16 is connected.

The aluminum foil 5 also may extend over the side walls along the bottom 10 of the vessel.

As cold delivering material a box can be used which is filled with a solution, for instance with a 25% common salt solution, which freezes at low temperatures.

In order to ensure a good heat conduction, an aluminum foil must be about 0.1 mm. thick.

In FIG. 3 the vessel has a heat-insulating layer 21 with an exterior thin coating 22 of hard polyvinyl chloride. Also the bottom is coated with a layer 23 of polyvinyl chloride and the upper rim of the vessel is coated with a ring 24 of polyvinyl chloride. In about the half thickness of the heat-insulating layers an aluminum foil 28 of a thickness of 0.2 mm. is provided the upper rim of which is bent over a shoulder 26 of the side walls. A second aluminum foil 25 with a thickness of about 0.2 mm. is provided on the inner side of the heat-insulating layer 21 the upper end of which is also bent over the shoulder 26 of the side walls heat conductingly overlapping the aluminum foil 28.

In order to avoid a direct contact of the second aluminum foil 25 with the contents of the vessel the second aluminum foil 25 is coated with a thin layer 30 of hard polyvinyl chloride.

On the part of the second aluminum foil 25 bent over the shoulder rests a flat aluminum bowl 27 with the cold or heat-delivering material 29. As well the aluminum foil 28 as the second aluminum foil 25 are heat conductingly connected to the cold and heat-delivering material 29 by the aluminum bowl 27. The cover of the receptacle is the same as in FIGS. 1 and 2.

The walls of the vessel in FIG. 4 comprise the same layers of material as in FIG. 3. Here an aluminum foil 45 is provided within the heat-insulating layer 31, and a second aluminum foil 35 is provided on the inner side of the heat-insulating layer 31. A thin hard layer 32 of polyvinyl chloride covers the vessel and a same layer 33 covers the bottom and a further layer 34 covers the upper rim of the walls. A thin layer 40 of hard polyvinyl chloride is provided.

As a difference over FIG. 3 the side walls in FIG. 4 besides the shoulder 36 have still another higher shoulder 46 around which the aluminum foil 45 is bent, whereas the second aluminum foil 35 is bent around the shoulder 36. On the shoulders 46 and 36 rest aluminum bowls 47, 37 which heat conductingly contact bent over parts of the foils 45 and 35. The upper bowl 47 may receive ice 49 and the lower bowl 37 may receive Dry Ice 39.

The receptacle of the invention keeps its contents for several hours at a temperature substantially below 0° C. and therefore is also suited for the transport of deeply frozen foodstuffs such as fish.

We claim:

1. Receptacle for keeping the contents of the receptacle, for instance, foodstuffs, either hot or cold, comprising a container of heat-insulating material, an inset of heat conducting material with a cold or heat-delivering material, a plurality of alternative layers of heat-insulating material and of heat-conductive material forming an inherently rigid vessel, and means heat conductively connecting said heat-conductive layers to said inset.

2. Receptacle for keeping the contents of the receptacle, for instance, foodstuffs, either hot or cold, comprising a container of heat-insulating material, a plurality of insets of heat-conducting material with a cold or heat-delivering material, a plurality of alternative layers of heat insulating material and of heat-conductive material forming an inherently rigid vessel, and means heat conductively connecting said heat conductive layers to said insets.

3. Receptacle for keeping the contents of the receptacle, for instance, foodstuffs, either hot or cold, comprising a container of heat-insulating material and inset of heat-conducting material with a cold or heat-delivering material, the heat-insulating material forming an inherently rigid vessel, the interior wall of which has an inwardly directed shoulder in the upper portion thereof and an inherently rigid cover, wherein at least the greater part of the interior wall of said vessel, including said shoulder, is provided with a layer of heat-conducting material thereon, and wherein said inset rests on said shoulder in such a manner as to make intimate contact with said heat-conducting material in a heat-conductive manner at said shoulder.

References Cited

UNITED STATES PATENTS

| | | | |
|---|---|---|---|
| 995,188 | 6/1911 | Seely | 62—529 X |
| 1,027,660 | 5/1912 | Larrance | 62—371 X |
| 1,720,935 | 7/1929 | Tressel | 62—371 X |
| 1,890,771 | 2/1932 | Drummond | 62—372 |
| 2,037,592 | 4/1936 | Rice | 62—372 |
| 2,787,891 | 4/1957 | Hengehold | 62—371 X |
| 3,178,903 | 4/1965 | Proctor | 62—372 |
| 3,225,983 | 12/1965 | Majka | 62—371 X |

FOREIGN PATENTS 290,059   5/1928   Great Britain.

ROBERT A. O'LEARY, *Primary Examiner.*

A. W. DAVIS, *Assistant Examiner.*